United States Patent
Sawal et al.

(10) Patent No.: US 12,468,797 B2
(45) Date of Patent: Nov. 11, 2025

(54) TRUSTED CLOUD DEVICE LIFECYCLE MANAGEMENT

(71) Applicant: Dell Products L.P., Round Rock, TX (US)

(72) Inventors: Vinay Sawal, Fremont, CA (US); Viswanath Ponnuru, KA (IN); Alan White, Glasgow (GB); Yi Fang, Sharon, MA (US); Igor Pedan, Vienna, VA (US)

(73) Assignee: Dell Products L.P., Round Rock, TX (US)

( * ) Notice: Subject to any disclaimer, the term of this patent is extended or adjusted under 35 U.S.C. 154(b) by 210 days.

(21) Appl. No.: 18/343,652

(22) Filed: Jun. 28, 2023

(65) Prior Publication Data

US 2025/0005128 A1    Jan. 2, 2025

(51) Int. Cl.
*G06F 21/00* (2013.01)
*G06F 11/20* (2006.01)
*G06F 21/44* (2013.01)

(52) U.S. Cl.
CPC .......... *G06F 21/44* (2013.01); *G06F 11/2051* (2013.01)

(58) Field of Classification Search
CPC .............................. G06F 11/2051; G06F 21/44
See application file for complete search history.

(56) References Cited

U.S. PATENT DOCUMENTS

| | | | | |
|---|---|---|---|---|
| 8,286,093 | B2 * | 10/2012 | Martinez | G06F 8/61 |
| | | | | 715/810 |
| 11,294,761 | B1 * | 4/2022 | Puttur | G06F 11/142 |
| 12,101,407 | B1 * | 9/2024 | Xu | H04L 9/3213 |
| 2010/0106320 | A1 * | 4/2010 | Grohman | G05B 19/0428 |
| | | | | 710/316 |
| 2016/0048389 | A1 * | 2/2016 | Paulraj | G06F 8/654 |
| | | | | 717/170 |
| 2019/0132308 | A1 * | 5/2019 | Graham | H04L 63/0876 |
| 2025/0004639 | A1 | 1/2025 | Sawal et al. | |
| 2025/0005614 | A1 | 1/2025 | Sawal et al. | |
| 2025/0007898 | A1 | 1/2025 | Sawal et al. | |
| 2025/0007954 | A1 | 1/2025 | Sawal et al. | |

* cited by examiner

*Primary Examiner* — Rodman Alexander Mahmoudi
(74) *Attorney, Agent, or Firm* — Amin, Turocy & Watson, LLP

(57) ABSTRACT

A system can receive an untrusted onboard announcement message from a remote computer, wherein the untrusted onboard announcement message comprises first data that identifies the remote computer and second data that indicates a current configuration of the remote computer. The system can identify a stored indication of an authorized configuration of the remote computer based on the data that identifies the remote computer. The system can determine that there is a mismatch between the authorized configuration of the remote computer and the current configuration of the remote computer. The system can determine a trust metrics evaluation score for the remote computer based on a type of hardware component change between the authorized configuration of the remote computer and the current configuration of the remote computer. The system can, in response to determining that the trust metrics evaluation score is greater than a threshold value, onboard the remote computer.

20 Claims, 13 Drawing Sheets

700

(702)

↓

RECEIVING AN UNTRUSTED ONBOARD ANNOUNCEMENT MESSAGE FROM A REMOTE COMPUTER, WHEREIN THE UNTRUSTED ONBOARD ANNOUNCEMENT MESSAGE COMPRISES FIRST DATA THAT IDENTIFIES THE REMOTE COMPUTER AND SECOND DATA THAT INDICATES A CURRENT CONFIGURATION OF THE REMOTE COMPUTER 704

↓

IDENTIFYING A STORED INDICATION OF AN AUTHORIZED CONFIGURATION OF THE REMOTE COMPUTER BASED ON THE DATA THAT IDENTIFIES THE REMOTE COMPUTER 706

↓

DETERMINING THAT THERE IS A MISMATCH BETWEEN THE AUTHORIZED CONFIGURATION OF THE REMOTE COMPUTER AND THE CURRENT CONFIGURATION OF THE REMOTE COMPUTER 708

↓

DETERMINING A TRUST METRICS EVALUATION SCORE FOR THE REMOTE COMPUTER BASED ON A TYPE OF HARDWARE COMPONENT CHANGE BETWEEN THE AUTHORIZED CONFIGURATION OF THE REMOTE COMPUTER AND THE CURRENT CONFIGURATION OF THE REMOTE COMPUTER 710

↓

IN RESPONSE TO DETERMINING THAT THE TRUST METRICS EVALUATION SCORE IS GREATER THAN A THRESHOLD VALUE, ONBOARDING THE REMOTE COMPUTER 712

VERIFYING THE INFORMATION IN THE SECOND UNTRUSTED ONBOARD
ANNOUNCE MESSAGE 804

↓

IN RESPONSE TO THE VERIFYING, PERFORMING A SECOND ONBOARDING OF THE REMOTE
COMPUTER, WHEREIN THE SECOND ONBOARDING OF THE REMOTE COMPUTER COMPRISES
AN INITIAL ONBOARDING OF THE REMOTE COMPUTER 806

TRUSTED CLOUD DEVICE LIFECYCLE MANAGEMENT

BACKGROUND

Computer systems can be managed remotely.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive an untrusted onboard announcement message from a remote computer, wherein the untrusted onboard announcement message comprises first data that identifies the remote computer and second data that indicates a current configuration of the remote computer. The system can identify a stored indication of an authorized configuration of the remote computer based on the data that identifies the remote computer. The system can determine that there is a mismatch between the authorized configuration of the remote computer and the current configuration of the remote computer. The system can determine a trust metrics evaluation score for the remote computer based on a type of hardware component change between the authorized configuration of the remote computer and the current configuration of the remote computer. The system can, in response to determining that the trust metrics evaluation score is greater than a threshold value, onboard the remote computer.

An example method can comprise receiving, by a system comprising a processor, a message from a remote computer, wherein the message is indicative of a request to onboard the remote computer. The method can comprise identifying, by the system, a stored indication of an authorized configuration of the remote computer based on the message from the remote computer. The method can comprise determining, by the system, that the authorized configuration of the remote computer differs from a current configuration of the remote computer, wherein the message from the remote computer indicates the current configuration of the remote computer. The method can comprise determining, by the system, a trust metrics evaluation score for the remote computer based on a type of hardware component change between the authorized configuration of the remote computer and the current configuration of the remote computer. The method can comprise, in response to determining that the trust metrics evaluation score is greater than a specified threshold value, onboarding, by the system, the remote computer.

An example non-transitory computer-readable medium can comprise instructions that, in response to execution, cause a system comprising a processor to perform operations. These operations can comprise receiving a message from a remote computer, wherein the message is indicative of a request to onboard the remote computer. These operations can further comprise identifying a stored indication of an authorized configuration of the remote computer based on the message from the remote computer. These operations can further comprise determining that the authorized configuration of the remote computer differs from a current configuration of the remote computer, wherein the message from the remote computer indicates the current configuration of the remote computer. These operations can further comprise determining a score for the remote computer based on a type of hardware component change between the authorized configuration of the remote computer and a current configuration of the remote computer. These operations can further comprise, in response to determining that the score satisfies a function of a threshold value, onboarding the remote computer.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 7 illustrates an example process flow that can facilitate trusted cloud device lifecycle management, in accordance with an embodiment of this disclosure;

FIG. 8 illustrates another example process flow that can facilitate trusted cloud device lifecycle management, in accordance with an embodiment of this disclosure;

DETAILED DESCRIPTION

Overview

A hybrid cloud management platform can generally facilitate hybrid cloud computing—that which combines hosted computing on behalf of a customer along with computers installed on the customer's premises. The examples described herein generally relate to hybrid clouds, and it can be appreciated that the present techniques can be applied to other computer management scenarios.

A hybrid cloud management platform can provide a common pool of configurable computing resources with easy, on-demand access. These resources can comprise servers, applications, storage, and other types of computing services. In some examples, a cloud platform is a private cloud, where computers are owned and operated as a resource to which access is restricted to one authorized entity (in contrast to a public cloud, where generally anyone who pays the associated fee can use the resources). The present techniques can relate to device onboarding and secure lifecycle management for private clouds.

Provisioning for a cloud can involve deployment of in-band (host) and out-of-band (on-premises) system configurations, and host application stack.

A problem with provisioning for a cloud can relate to a manual onboarding process not being scalable and efficient when a large number of out-of-band devices are to be provisioned. Another problem with provisioning for a cloud can relate to unauthorized personnel usage and insecure configurations during a device ownership claim process can lead to a compromised cloud tenant state.

The present techniques can be implemented to address these problems, via efficient and remotely-attested out-of-band device lifecycle management, which can provide for secure onboarding, renewal, and decommissioning.

Example Architectures

Figure 1:
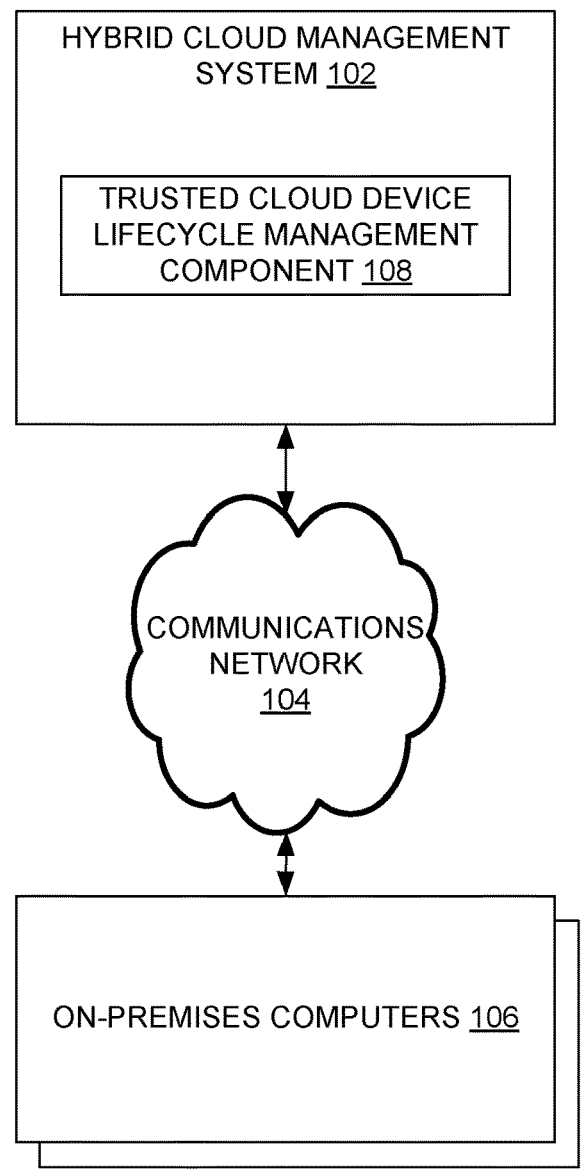
FIG. 1 illustrates an example system architecture that can facilitate trusted cloud device lifecycle management, in accordance with an embodiment of this disclosure.

FIG. 1 illustrates an example system architecture 100 that can facilitate trusted cloud device lifecycle management, in accordance with an embodiment of this disclosure.

System architecture 100 comprises hybrid cloud management system 102, communications network 104, and on-premises computers 106. In turn, hybrid cloud management system 102 comprises trusted cloud device lifecycle management component 108.

Figure 13:
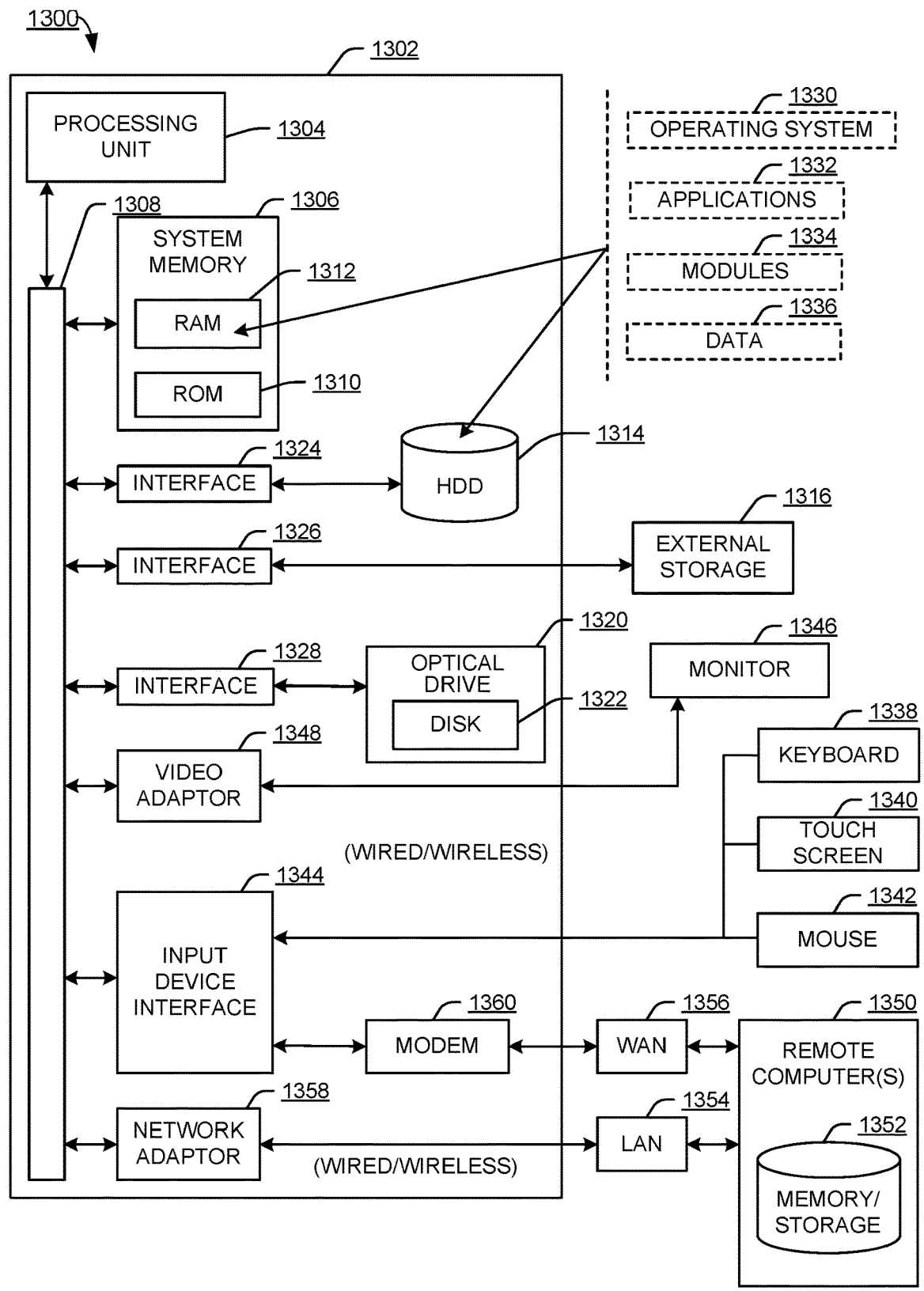
FIG. 13 illustrates an example block diagram of a computer operable to execute an embodiment of this disclosure.

Each of hybrid cloud management system 102 and/or on-premises computers 106 can be implemented with part(s) of computing environment 1300 of FIG. 13. Communications network 104 can comprise a computer communications network, such as the Internet.

On-premises computers 106 can comprise one or more computers that are installed on a customer's premises and are (or are to be) managed by hybrid cloud management system 102. As part of that, hybrid cloud management system 102 can securely onboard computers of on-premises computers 106, including re-validate those computers when they have parts replaced or modified (e.g., reset or firmware modifications).

In some examples, trusted cloud device lifecycle management component 108 can implement part(s) of the process flows of FIGS. 4-12 to implement trusted cloud device lifecycle management.

It can be appreciated that system architecture 100 is one example system architecture for trusted cloud device lifecycle management, and that there can be other system architectures that facilitate trusted cloud device lifecycle management.

Figure 2:
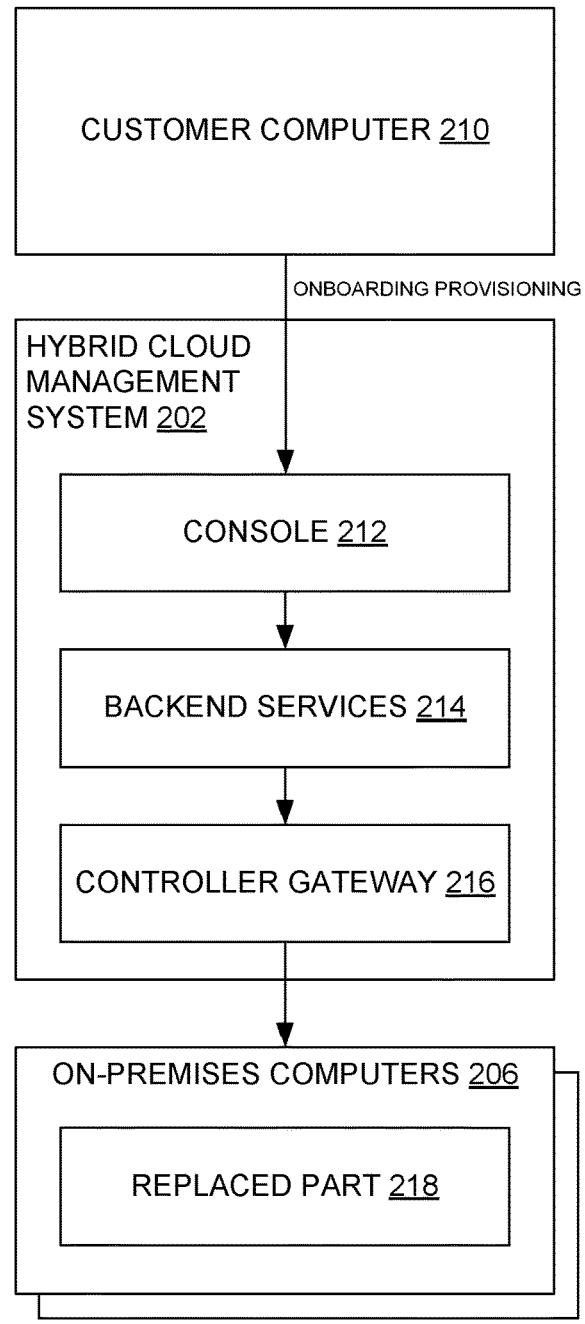
FIG. 2 illustrates another example system architecture that can facilitate trusted cloud device lifecycle management, in accordance with an embodiment of this disclosure.

FIG. 2 illustrates another example system architecture 200 that can facilitate trusted cloud device lifecycle management, in accordance with an embodiment of this disclosure. In some examples, part(s) of system architecture 200 can be used to implement part(s) of system architecture 100 of FIG. 1.

System architecture 200 comprises hybrid cloud management system 202 (which can be similar to hybrid cloud management system 102 of FIG. 1), on-premises computers 206 (which can be similar to on-premises computers 106), and customer computer 210. In turn, hybrid cloud management system 202 comprises console 212, backend services 214, and controller gateway; and on-premises computers 206 comprises replaced part 218.

Customer computer 210 can contact hybrid cloud management system 202 to initiate onboarding provisioning of one or more computers of on-premises computers 206. This message from customer computer 210 can be received at console 212 (which can generally comprise a front end of hybrid cloud management system 202 that is configured to interact with customer computer 210), and can be communicated through backend services 214 and controller gateway 216 to perform onboarding provisioning of one or more computers of on-premises computers 206.

Backend services 214 can comprise a collection of services running in the cloud that are configured to provide backend functions for running services for a customer subscribing to cloud resources. Controller gateway 216 can comprise communication infrastructure that is configured to connect cloud services to a remote endpoint that is physically located on-premises for a customer.

In this example, a part of one computer of on-premises computers 206 has been replaced with replaced part 218, and this can necessitate re-onboarding the corresponding computer as part of lifecycle management of that computer.

Figure 3:
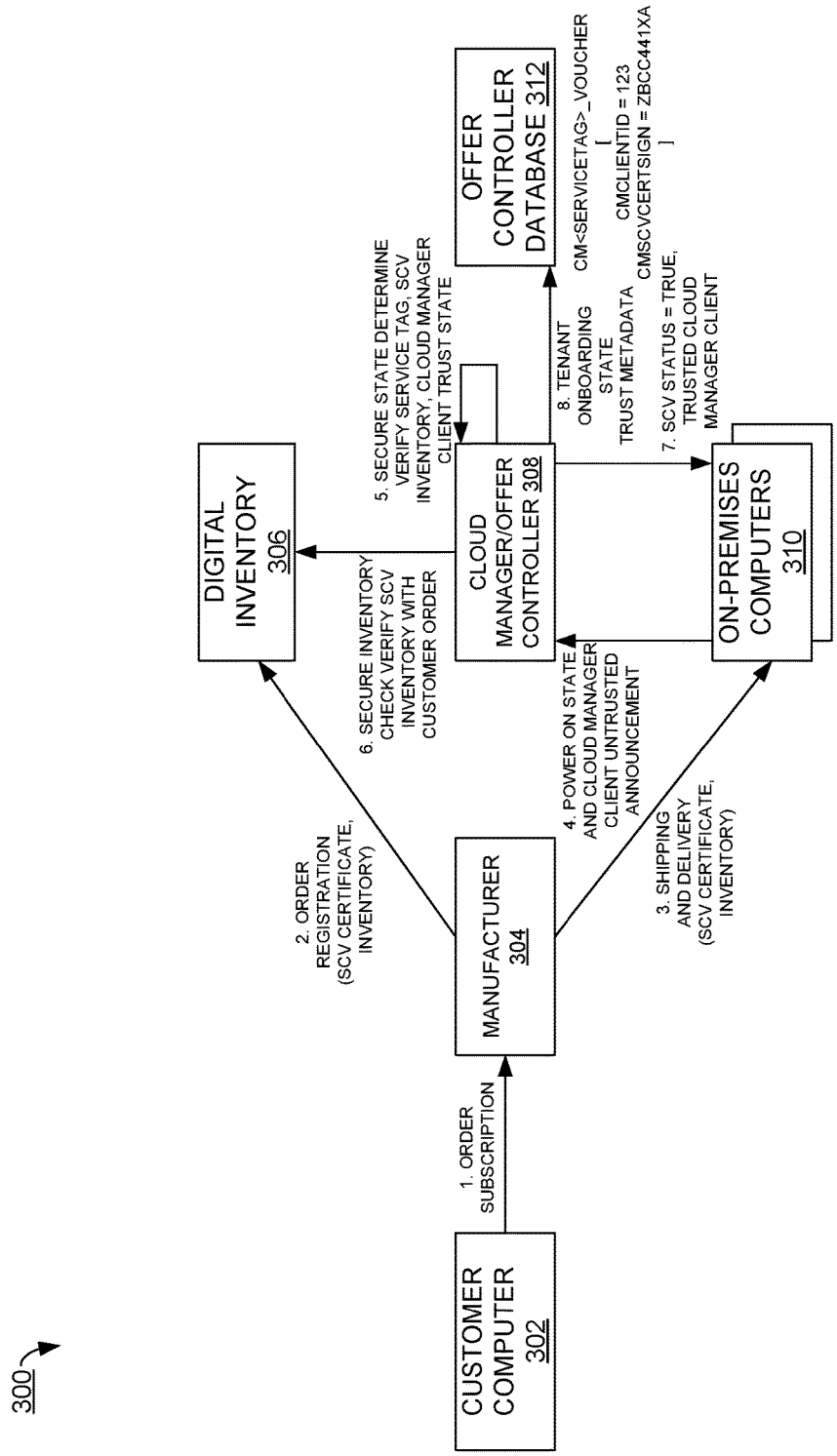
FIG. 3 illustrates another example system architecture that can facilitate trusted cloud device lifecycle management, in accordance with an embodiment of this disclosure.

FIG. 3 illustrates another example system architecture 300 that can facilitate trusted cloud device lifecycle management, in accordance with an embodiment of this disclosure. In some examples, part(s) of system architecture 300 can be used to implement part(s) of system architecture 100 of FIG. 1.

System architecture 300 comprises customer computer 302 (which can be similar to customer computer 210 of FIG. 2), manufacturer 304, digital inventory 306 (which can comprise a computer system that handles customer order workflows, such as those customer orders for on-premises computers 310), cloud manager/offer controller 308 (which can comprise a subscription-based cloud computing service that can include on-premises resources; the cloud manager can communicate with a cloud manager client on an on-premises computer to facilitate a connection with the on-premises computer that can be used to manage the on-premises computer), on-premises computers 310 (which can be similar to on-premises computers 106 of FIG. 1), and offer controller database 312 (which can store information about customer orders).

System architecture 300 can facilitate creating a secure ownership voucher that is configured to be used in device claims in establishing secure connections and integrity verification throughout the lifecycle of an on-premises computer of on-premises computers 310. The example of FIG. 3 generally relates to automated secure trusted onboarding of computers for a hybrid cloud management system (e.g., hybrid cloud management system 102 of FIG. 1). Then, the example of FIG. 4 generally relates to re-onboarding a computer after it has had a part replaced, or otherwise modified.

In the example of FIG. 3, the following operations can occur.

1. Customer computer 302 can place an order for a computer of on-premises computers 310 via manufacturer 304. Manufacturer 304 can comprise a computer component that facilitates receiving and fulfilling computer orders. A computer being built can have installed on it a unique root of trust key and inventory data created, which can be called a secure component identifier (SCV). An ownership voucher will be created and signed by the root of trust key for evidence and remote attestation purposes. This information can be stored in a remote access controller hardware component.
2. The computer can be registered in digital inventory 306 along with details of the order.
3. The customer order can be securely shipped to the customer's location. The customer can perform an initial installation of the computer in its on-premises data center.
4. A power-on sequence of this newly installed computer can be initiated. A cloud manager client on the computer can publish an untrusted announce state message to a uniform resource identifier (URI) that is stored in the computer, where the URI identifies a console registration of cloud manager/offer controller 308.
5. A cloud manager client secure state determination process can include verifying a service tag (which can uniquely identify the computer), SCV inventory (of components in the computer), and console manager client trust state (which can comprise a component that is configured to, during an onboarding process for a remote computer, run a trust establishment state machine to determine if the remote computer can be trusted).
6. This received information can be verified against order information that is stored in digital inventory 306 to check SCV certificate proof-of-possession, certificate ownership, and inventory matches against the order.
7. Where this verification is successful, the computer can be placed in a trusted secure onboarding state.
8. An order-specific tenant onboarding secure state can be stored in offer controller database 312 for future analysis and analytics purposes.

Figure 4:
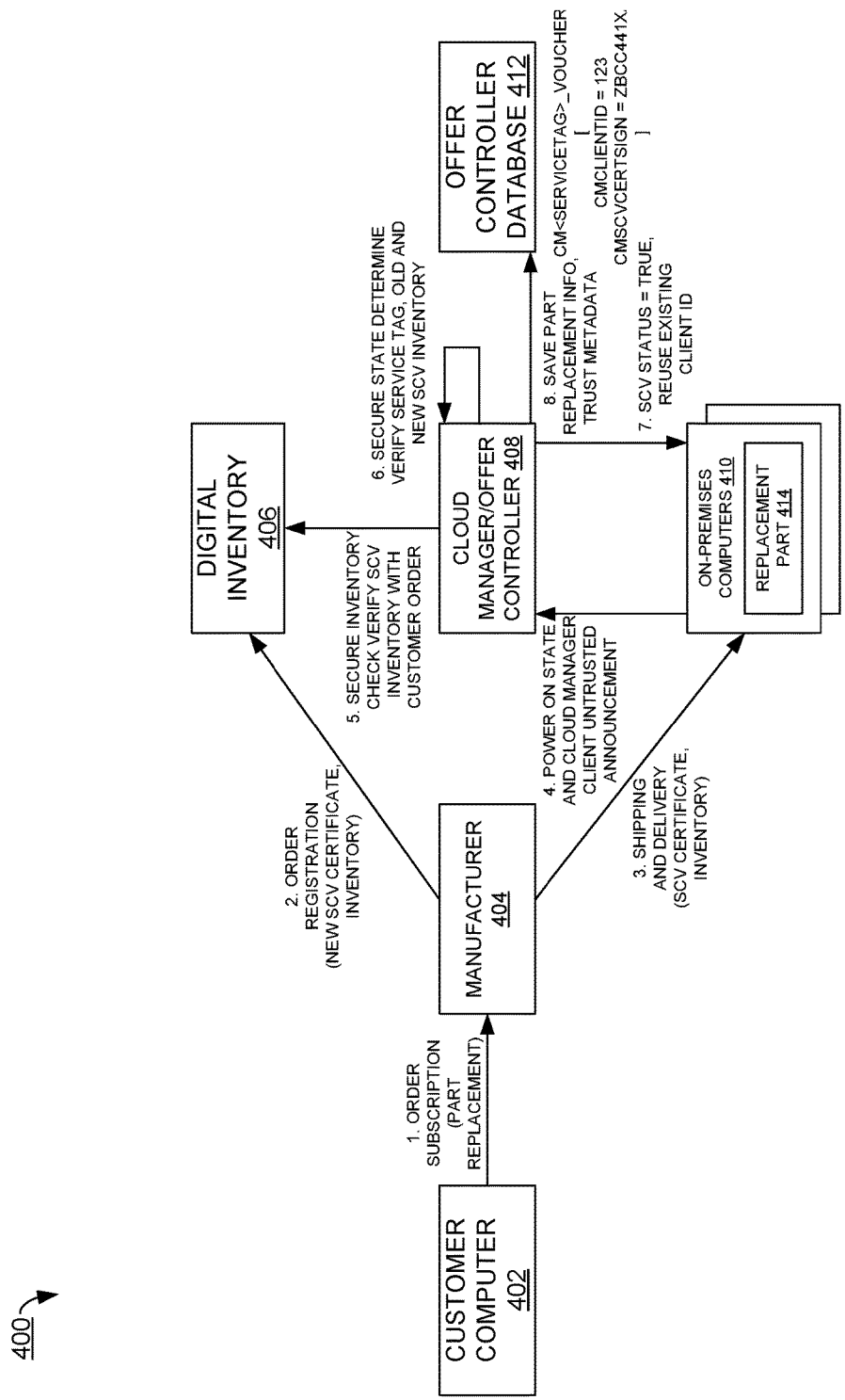
FIG. 4 illustrates another example system architecture that can facilitate trusted cloud device lifecycle management, in accordance with an embodiment of this disclosure.

FIG. 4 illustrates another example system architecture 400 that can facilitate trusted cloud device lifecycle management, in accordance with an embodiment of this disclosure. In some examples, part(s) of system architecture 400 can be used to implement part(s) of system architecture 100 of FIG. 1.

System architecture 400 comprises customer computer 402 (which can be similar to customer computer 302 of FIG. 3), manufacturer 404 (which can be similar to manufacturer 304), digital inventory 406 (which can be similar to digital inventory 306), cloud manager/offer controller 408 (which can be similar to cloud manager/offer controller 308), on-premises computers 410 (which can be similar to on-premises computers 310), offer controller database 412 (which can be similar to offer controller database 312), and replacement part 414 (which can be similar to replaced part 218 of FIG. 2).

System architecture 400 can facilitate creating a secure ownership voucher that is configured to be used in device claims in establishing secure connections and integrity verification throughout the lifecycle of an on-premises computer of on-premises computers 410. The example of FIG. 4 generally relates to re-onboarding a computer after it has had a part replaced, or otherwise modified. This can be viewed in contrast to the example of FIG. 3, which generally relates to automated secure trusted onboarding of computers for a hybrid cloud management system (e.g., hybrid cloud management system 102 of FIG. 1).

In the example of FIG. 4, the following operations can occur.
1. Customer computer 402 can place an order for a computer of on-premises computers 410 via manufacturer 404. Manufacturer 404 can comprise a computer component that facilitates receiving and fulfilling computer orders. A computer being built can have installed on it a unique root of trust key and inventory data created, which can be called a secure component identifier (SCV). An ownership voucher will be created and signed by the root of trust key for evidence and remote attestation purposes. This information can be stored in a remote access controller hardware component.
2. The computer can be registered in digital inventory 406 along with details of the order.
3. The customer order can be securely shipped to the customer's location. The customer can perform an initial installation of the computer in its on-premises data center.
4. A power-on sequence of this newly installed computer can be initiated. A cloud manager client on the computer can publish an untrusted announce state message to a uniform resource identifier (URI) that is stored in the computer, where the URI identifies a console registration of cloud manager/offer controller 408. In some examples, these initial operations in FIG. 4 can be similar to those of FIG. 3.
5. After the successful replacement of part (e.g., motherboard) in a computer of on-premises computers 410, and that computer being powered on, a cloud management client on that computer can send an untrusted announcement notification to cloud manager/offer controller 408.
6. Cloud manager/offer controller 408 can process the untrusted event notification and check the new customer inventory and SCV certificate against that which is stored in digital inventory 406 to verify the customer order details.
7. A cloud management client secure state determination process can include verifying a service tag of the new computer, SCV old and new inventory data, serial number and hardware identifier, hardware identifier signatures, etc.
8. Where this verification is successful, the device can be placed in a trusted secure onboarding state and can reuse an existing cloud manager client ID instance to establish trust between the cloud management client and a console onboarding process of cloud manager/offer controller 408.
9. A customer-specific tenant onboarding secure state and new part-replacement states can be stored in offer controller database 412 for future analysis and analytics purposes.

Example Process Flows

Figure 5:
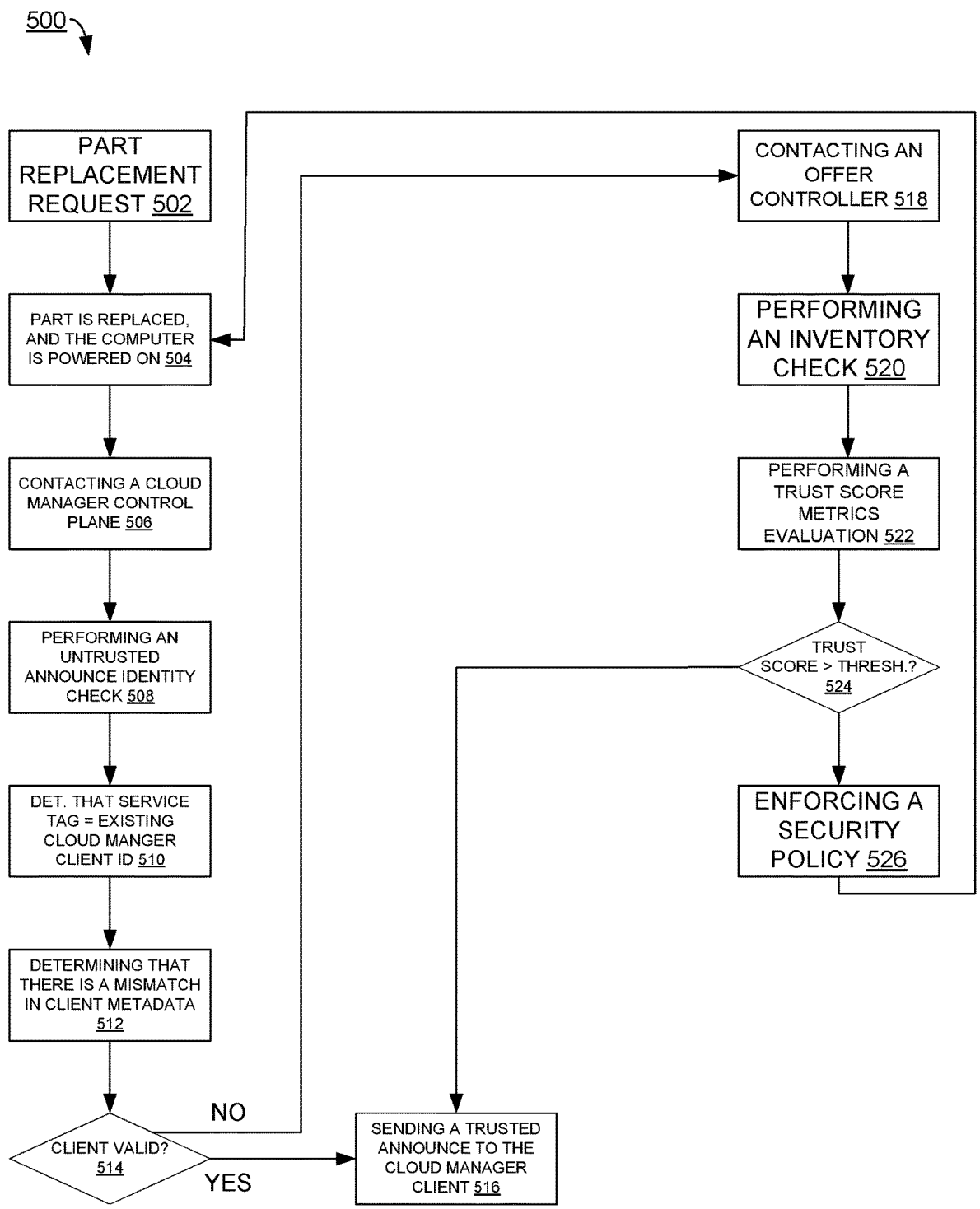
FIG. 5 illustrates an example process flow for evaluating a computer with a part replacement, and that can facilitate trusted cloud device lifecycle management, in accordance with an embodiment of this disclosure.

FIG. 5 illustrates an example process flow 500 for evaluating a computer with a part replacement and that can facilitate trusted cloud device lifecycle management, in accordance with an embodiment of this disclosure. In some examples, one or more embodiments of process flow 500 can be implemented by trusted cloud device lifecycle management component 108 of FIG. 1, or computing environment 1300 of FIG. 13.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 600 of FIG. 6, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

Process flow 500 begins with 502, and moves to operation 504.

Operation 502 depicts a part replacement request. That is, where a part in a computer has been replaced or modified, that computer can request being onboarded again.

After operation 502, process flow 500 moves to operation 504.

Operation 504 depicts a part is replaced, and the computer is powered on. That is, the computer with the replaced part can be powered on.

After operation 504, process flow 500 moves to operation 506.

Operation 506 depicts contacting a cloud manager control plane. This cloud manager control plane can be similar to cloud manager/offer controller 308 of FIG. 3.

After operation 506, process flow 500 moves to operation 508.

Operation 508 depicts performing an untrusted announce identity check. This can comprise using a service tag of the computer (which can uniquely identify the computer) to perform the identity check. In some examples, operation 508 can be performed by the cloud manager control plane of operation 506.

After operation 508, process flow 500 moves to operation 510.

Operation 510 depicts determining that the service tag matches an existing cloud manger client ID. In some examples, operation 510 can be performed by the cloud manager control plane of operation 506.

After operation 510, process flow 500 moves to operation 512.

Operation 512 depicts determining that there is a mismatch in client metadata. That is, the cloud manager control plane of operation 506 can determine that the metadata of the computer being evaluated differs from stored metadata previously determined about the computer.

Operation 514 depicts determining whether the client is valid. This can comprise the cloud manager control plane of operation 506 determining whether a cloud manager client that executes on the computer being evaluated is valid. When a remote computer is powered on, its client can go through an on-boarding procedure where there is a trust verification step to determine whether the client is valid and can be trusted.

Where in operation 514 it is determined that the client is valid, process flow 500 moves to operation 516. Instead, where in operation 512 it is determined that the client is not valid, process flow 500 moves to operation 518.

Operation 516 is reached from operation 514 where it is determined that the client is valid, or from operation 524 where it is determined that the trust score is above the threshold. Operation 516 depicts sending a trusted announce to the cloud manager client. That is, an onboarding process for the computer with the replaced part can continue. In some examples, operation 516 is performed by the cloud manager control plane of operation 506.

After operation 516, process flow 500 ends (though can continue to other steps for onboarding the computer).

Operation 518 is reached from operation 514 where it is determined that the client is not valid. Operation 518 depicts contacting an offer controller. This can be similar to offer controller database 312 of FIG. 3.

After operation 518, process flow 500 moves to operation 520.

Operation 520 depicts performing an inventory check. When a remote computer is powered up at a remote location, a software component within a remote access controller hardware component can probe hardware components within the remote computer to identify information (e.g., a make, model, serial number, etc.) about the respective components.

After operation 520, process flow 500 moves to operation 522.

Operation 522 depicts performing a trust score metrics evaluation. This can be the trust score metrics evaluation of process flow 600 of FIG. 6.

After operation 522, process flow 500 moves to operation 524.

Operation 524 depicts determining whether the trust score is above a threshold. Using the example where a trust score can range from 1 to 5, inclusive, the threshold can be 3.

Where in operation 524 it is determined that the trust score is above the threshold, process flow 500 moves to operation 516. Instead, where in operation 524 it is determined that the trust score is not above the threshold, process flow 500 moves to operation 526.

Operation 526 is reached from operation 524 where it is determined that the trust score is not above the threshold. Operation 526 depicts enforcing a security policy. This can comprise determining not to onboard the computer at this time, and raising an alert to an administrator regarding the failed onboarding.

After operation 504, process flow 500 moves to operation 504. At this point, another onboard of the computer can be attempted, such as after remedying an issue that caused the current instance of onboarding to be denied.

Figure 6:
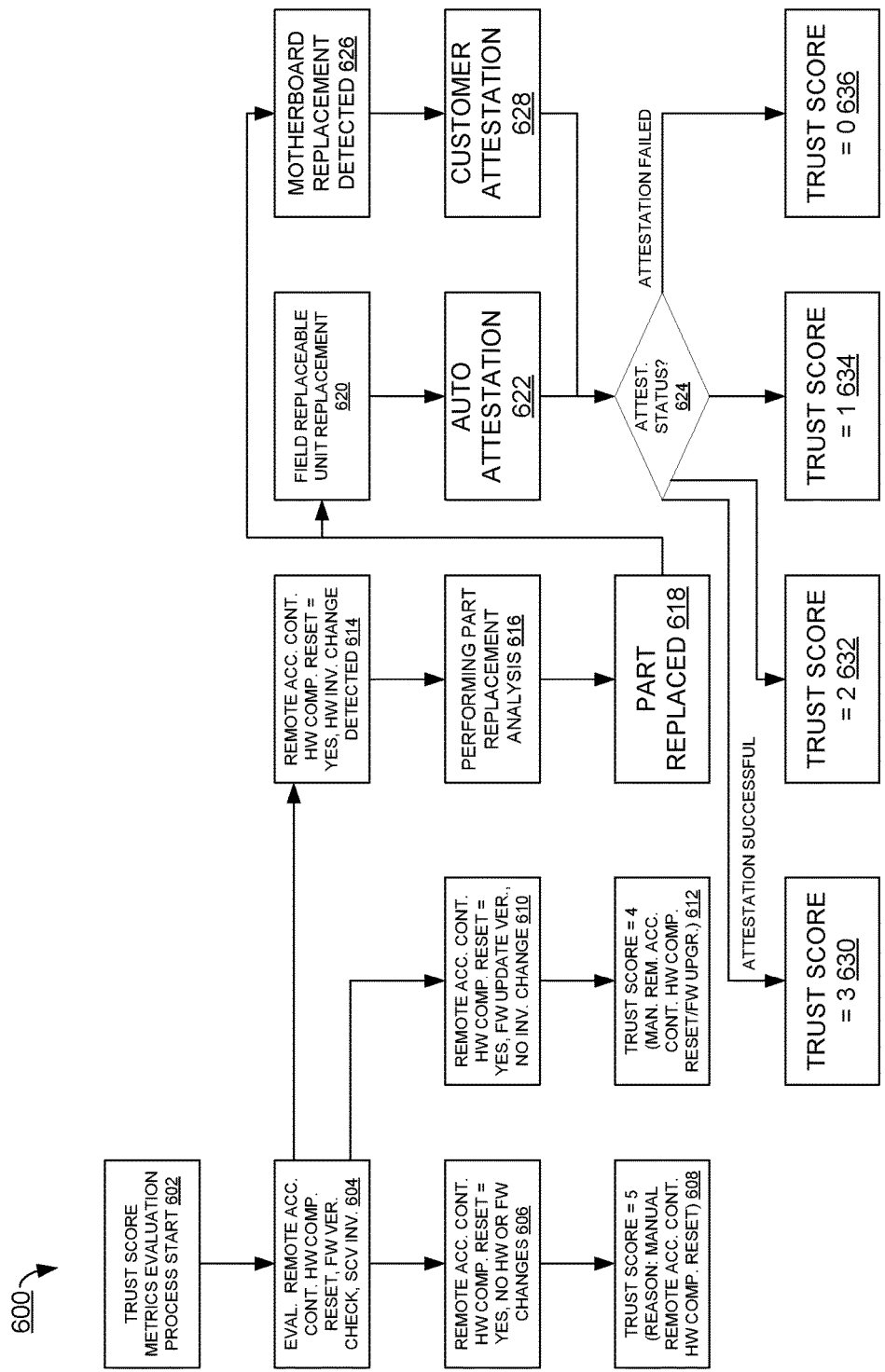
FIG. 6 illustrates an example process flow for determining a trust score, and that can facilitate trusted cloud device lifecycle management, in accordance with an embodiment of this disclosure.

FIG. 6 illustrates an example process flow 600 for determining a trust score, and that can facilitate trusted cloud device lifecycle management, in accordance with an embodiment of this disclosure. In some examples, one or more embodiments of process flow 600 can be implemented by trusted cloud device lifecycle management component 108 of FIG. 1, or computing environment 1300 of FIG. 13.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 500 of FIG. 5, process flow 700 of FIG. 7, process flow 800 of FIG. 8, process flow 900 of FIG. 9, process flow 1000 of FIG. 10, process flow 1100 of FIG. 11, and/or process flow 1200 of FIG. 12.

Process flow 600 begins with 602, and moves to operation 604.

Operation 602 depicts trust score metrics evaluation process start. That is, a computer can be evaluated and a trust score for that computer determined, where a trust score comprises a measurement of whether the computer should be onboarded.

After operation 602, process flow 600 moves to operation 604.

Operation 604 depicts evaluating remote access controller hardware component reset, firmware version check, SCV inventory. This can comprise determining whether any of these events has occurred with respect to the computer being evaluated.

After operation 604, process flow 600 moves to operation 606, operation 610, or operation 614 depending on the evaluation.

Operation 606 is reached from operation 604. Operation 606 depicts remote access controller hardware component reset=yes, no hardware or firmware changes. That is, this type of change with the computer can be identified. This can be a result determined from the evaluation in operation 604.

After operation 606, process flow 600 moves to operation 608.

Operation 608 depicts trust score=5 (reason: manual remote access controller hardware component reset). After operation 608, process flow 600 ends. The trust score of operation 608 can then be used by operation 522 of FIG. 5 to perform a trust score metrics evaluation.

Operation 610 is reached from operation 604. Operation 610 depicts remote access controller hardware component reset=yes, remote access controller hardware component firmware update new version, no changes in hardware inventory. That is, this type of change with the computer can be identified. This can be a result determined from the evaluation in operation 604.

After operation 610, process flow 600 moves to operation 612.

Operation 612 depicts trust score=4 (reason: manual remote access controller hardware component reset and firmware upgrade).

After operation 612, process flow 600 ends.

Operation 614 is reached from operation 604. Operation 614 depicts remote access controller hardware component reset=yes, hardware inventory change detected. That is, this type of change with the computer can be identified. This can be a result determined from the evaluation in operation 604.

After operation 614, process flow 600 moves to operation 616.

Operation 616 depicts performing part replacement analysis. That is, analysis can be performed to determine a type of part that has been replaced in the computer.

After operation 616, process flow 600 moves to operation 618.

Operation 618 depicts part replaced. That is, the part that has been replaced can be identified.

After operation 618, process flow 600 moves to operation 620, or operation 626, depending on the type of part replaced.

Operation 620 is reached from operation 618. Operation 620 depicts field replaceable unit replacement (network interface card (NIC), solid state drives (SSDs), memory card, fan, power supply unit (PSU), etc.). That is, it can be determined that a field replaceable unit has been replaced in the computer.

After operation 620, process flow 600 moves to operation 622.

Operation 622 depicts auto attestation. That is, it can be determined automatically that attestation for the computer with the part replacement is successful.

After operation 622, process flow 600 moves to operation 624.

Operation 624 is reached from operation 622 or operation 628. Operation 624 depicts determining an attestation status. After operation 624, process flow 600 moves to operation 630, operation 632, operation 634, operation 636, depending on the result of the attestation status.

Operation 626 is reached from operation 618. Operation 626 depicts motherboard replacement detected. That is, it can be determined that a motherboard has been replaced in the computer.

After operation 626, process flow 600 moves to operation 628.

Operation 628 depicts customer attestation. That is, attestation can be determined in response to receiving user input data associated with an entity on whose premises the computer is installed.

Operation 630 is reached from operation 624 where attestation succeeded. Operation 630 depicts trust score=3.

After operation 630, process flow 600 ends. The trust score of operation 630 can then be used by operation 522 of FIG. 5 to perform a trust score metrics evaluation.

Operation 632 depicts trust score=2. In an example where a trust score below three indicates failure for onboarding, a score of 2 can indicate a level of failure for onboarding.

After operation 632, process flow 600 ends. The trust score of operation 632 can then be used by operation 522 of FIG. 5 to perform a trust score metrics evaluation.

Operation 634 depicts trust score=1. In an example where a trust score below three indicates failure for onboarding, a score of 2 can indicate a level of failure for onboarding.

After operation 634, process flow 600 ends. The trust score of operation 634 can then be used by operation 522 of FIG. 5 to perform a trust score metrics evaluation. Operation 636 is reached from operation 624 where attestation failed.

Operation 636 depicts trust score=0.

After operation 636, process flow 600 ends. The trust score of operation 636 can then be used by operation 522 of FIG. 5 to perform a trust score metrics evaluation.

FIG. 7 illustrates an example process flow 700 that can facilitate trusted cloud device lifecycle management, in accordance with an embodiment of this disclosure. In some examples, one or more embodiments of process flow 700 can be implemented by trusted cloud device lifecycle management component 108 of FIG. 1, or computing environment 1300 of FIG. 13.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 500 of FIG. 5, process flow 600 of FIG. 6, process flow 800 of FIG. 8, process flow 900 of FIG. 9, process flow 1000 of FIG. 10, process flow 1100 of FIG. 11, and/or process flow 1200 of FIG. 12.

Process flow 700 begins with 702, and moves to operation 704.

Operation 704 depicts receiving an untrusted onboard announcement message from a remote computer, wherein the untrusted onboard announcement message comprises first data that identifies the remote computer and second data that indicates a current configuration of the remote computer. That is, an operation similar to operation 508 of FIG. 5 can be performed.

After operation 704, process flow 700 moves to operation 706.

Operation 706 depicts identifying a stored indication of an authorized configuration of the remote computer based on the data that identifies the remote computer. That is, an operation similar to operation 510 of FIG. 5 can be performed.

After operation 706, process flow 700 moves to operation 708.

Operation 708 depicts determining that there is a mismatch between the authorized configuration of the remote computer and the current configuration of the remote computer. That is, an operation similar to operation 512 of FIG. 5 can be performed.

After operation 708, process flow 700 moves to operation 710.

Operation 710 depicts determining a trust metrics evaluation score for the remote computer based on a type of hardware component change between the authorized configuration of the remote computer and the current configuration of the remote computer. That is, an operation similar to operation 522 of FIG. 5 can be performed.

After operation 710, process flow 700 moves to operation 712.

Operation 712 depicts, in response to determining that the trust metrics evaluation score is greater than a threshold value, onboarding the remote computer. That is, an operation similar to operation 516 of FIG. 5 can be performed.

After operation 712, process flow 700 moves to 714, where process flow 700 ends.

FIG. 8 illustrates another example process flow 800 that can facilitate trusted cloud device lifecycle management, in accordance with an embodiment of this disclosure. In some examples, one or more embodiments of process flow 800 can be implemented by trusted cloud device lifecycle management component 108 of FIG. 1, or computing environment 1300 of FIG. 13.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 500 of FIG. 5, process flow 600 of FIG. 6, process flow 700 of FIG. 7, process flow 900 of FIG. 9, process flow 1000 of FIG. 10, process flow 1100 of FIG. 11, and/or process flow 1200 of FIG. 12.

Process flow 800 begins with 802, and moves to operation 804.

In some examples (such as implementing process flow 800 in conjunction with process flow 700 of FIG. 7), the untrusted onboard announcement message is a first untrusted onboard announce message, and the onboarding of the remote computer is a first onboarding.

Operation 804 depicts verifying the information in the second untrusted onboard announce message. In some examples, operation 804 is performed before receiving the first untrusted onboard announce message, and in response to receiving a second untrusted onboard announce message from the remote computer, where the second untrusted onboard announce message comprises an initial untrusted onboard announce message from the remote computer and information to be verified. This can be an initial onboarding of the computer, in contrast to a subsequent onboarding during the lifecycle of the computer due to the computer having a part modified.

In some examples, the information is first information, verifying of the first information in the second untrusted onboard announce message comprises comparing the first information in the second untrusted onboard announce message with second information about ordering the remote computer. That is, information in the untrusted announce message can be compared with information about an original order for the computer.

In some examples, the information in the second untrusted onboard announce message originates from a certificate stored on the remote computer, and wherein the certificate is signed by the system. That is, the remote computer can store this information used in the untrusted onboard announce message in a SCV.

After operation 804, process flow 800 moves to operation 806.

Operation 806 depicts, in response to the verifying, performing a second onboarding of the remote computer, wherein the second onboarding of the remote computer comprises an initial onboarding of the remote computer.

In some examples, a first entity performs the verifying of the information in the second untrusted onboard announce message, a second entity has physical possession of the remote computer at a time that the verifying of the information in the second untrusted onboard announce message is performed, and the first entity has processed an order by the second entity for the remote computer. That is, a customer can order a computer from a manufacturer, and once the computer is installed on the customer's premises, then the computer can be onboarded onto a hybrid cloud management system that is operated by the manufacturer.

After operation 806, process flow 800 moves to 808, where process flow 800 ends.

Figure 9:
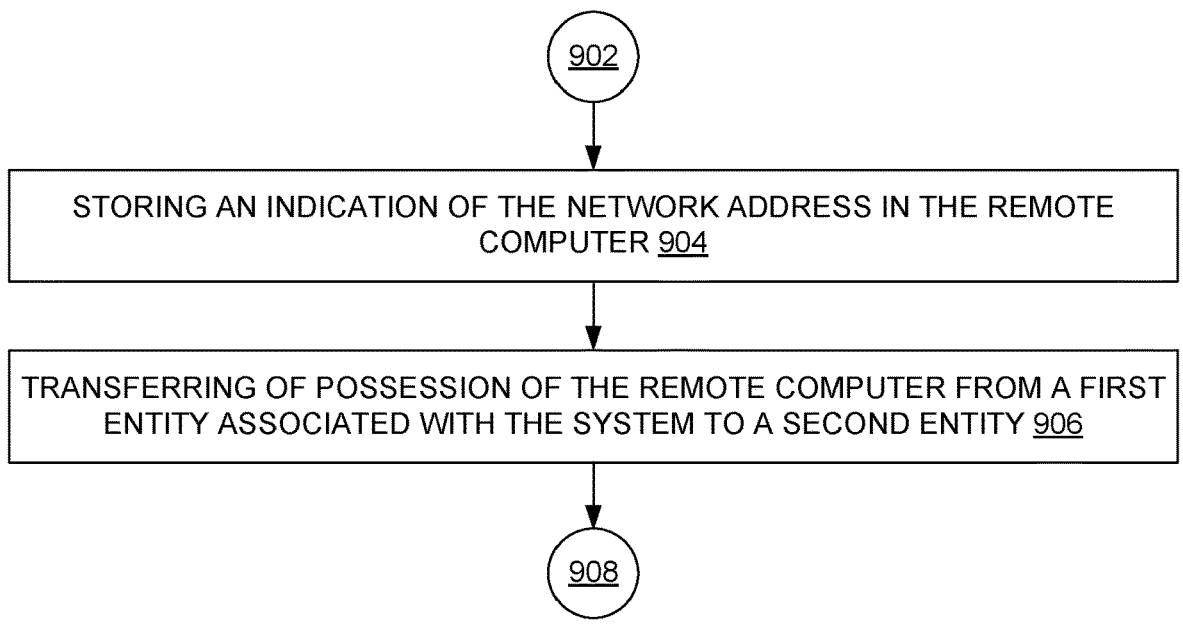
FIG. 9 illustrates another example process flow that can facilitate trusted cloud device lifecycle management, in accordance with an embodiment of this disclosure.

FIG. 9 illustrates another example process flow 900 that can facilitate trusted cloud device lifecycle management, in accordance with an embodiment of this disclosure. In some examples, one or more embodiments of process flow 900 can be implemented by trusted cloud device lifecycle management component 108 of FIG. 1, or computing environment 1300 of FIG. 13.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 500 of FIG. 5, process flow 600 of FIG. 6, process flow 700 of FIG. 7, process flow 800 of FIG. 8, process flow 1000 of FIG. 10, process flow 1100 of FIG. 11, and/or process flow 1200 of FIG. 12.

Process flow 900 begins with 902, and moves to operation 904.

In some examples, the untrusted onboard announcement message received from the remote computer, as in operation 704 of FIG. 7, is directed to a network address that is associated with the system.

Operation 904 depicts storing an indication of the network address in the remote computer. This can be performed by an entity that manufactures the remote computer (e.g., an entity associated with manufacturer 304 of FIG. 3).

After operation 904, process flow 900 moves to operation 906.

Operation 906 depicts transferring of possession of the remote computer from a first entity associated with the system to a second entity. That is, after the computer is manufactured (including storing the indication of the network address in the remote computer), the computer can be transferred to a customer premises (e.g., as part of on-premises computers 106 of FIG. 1), and then the computer can contact a management platform (e.g., hybrid cloud management system 102) via the stored network address.

Together, operations 904-906 can comprise storing an indication of the network address in the remote computer prior to a transfer of possession of the remote computer from a first entity associated with the system to a second entity.

After operation 906, process flow 900 moves to 908, where process flow 900 ends.

Figure 10:
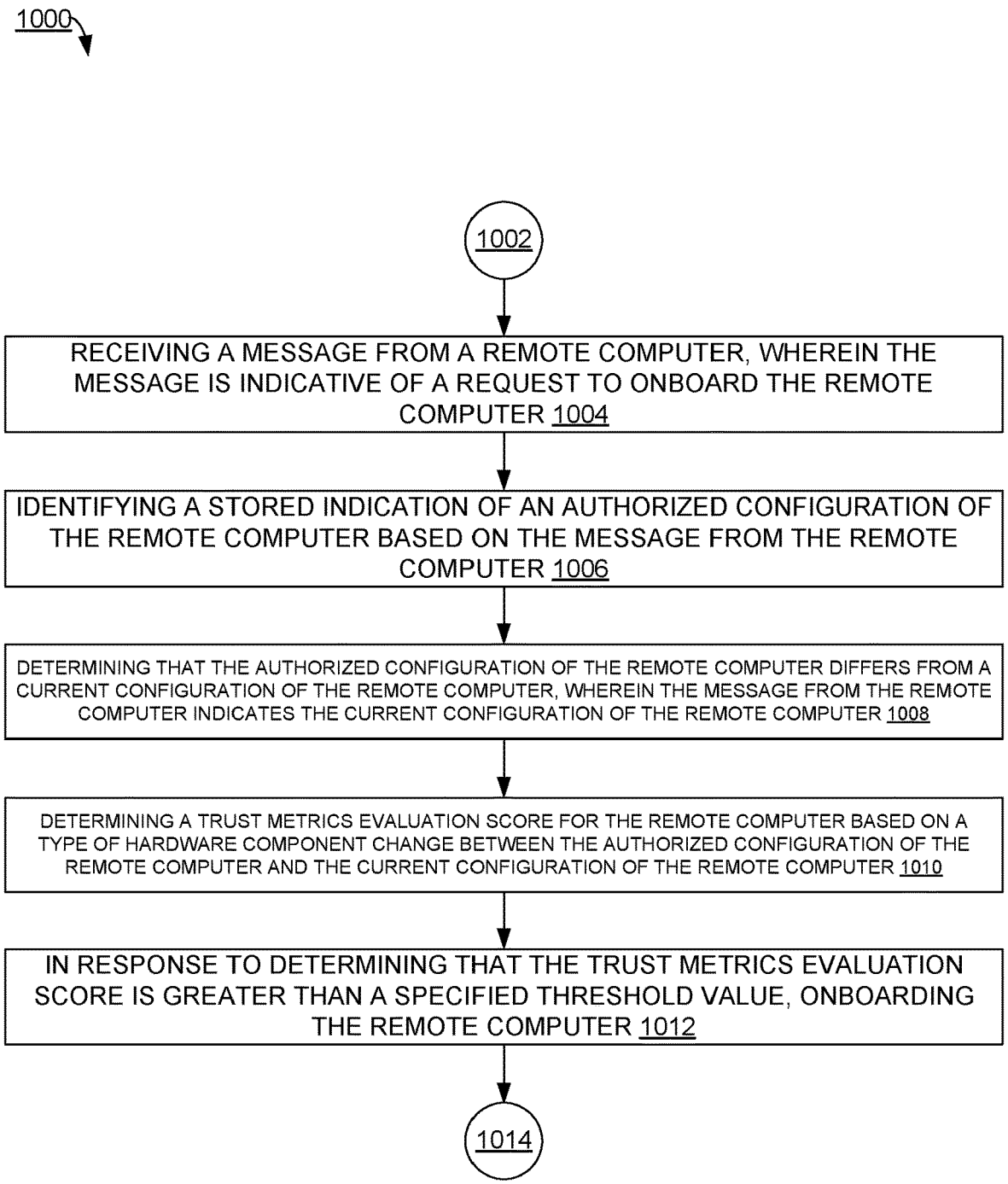
FIG. 10 illustrates another example process flow that can facilitate trusted cloud device lifecycle management, in accordance with an embodiment of this disclosure.

FIG. 10 illustrates another example process flow 1000 that can facilitate trusted cloud device lifecycle management, in accordance with an embodiment of this disclosure.

In some examples, one or more embodiments of process flow 1000 can be implemented by trusted cloud device lifecycle management component 108 of FIG. 1, or computing environment 1300 of FIG. 13.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 500 of FIG. 5, process flow 600 of FIG. 6, process flow 700 of FIG. 7, process flow 800 of FIG. 8, process flow 900 of FIG. 9, process flow 1100 of FIG. 11, and/or process flow 1200 of FIG. 12.

Process flow 1000 begins with 1002, and moves to operation 1004.

Operation 1004 depicts receiving a message from a remote computer, wherein the message is indicative of a request to onboard the remote computer. In some examples, operation 1004 can be implemented in a similar manner as operation 704 of FIG. 7.

After operation 1004, process flow 1000 moves to operation 1006.

Operation 1006 depicts identifying a stored indication of an authorized configuration of the remote computer based on the message from the remote computer. In some examples, operation 1006 can be implemented in a similar manner as operation 706 of FIG. 7.

After operation 1006, process flow 1000 moves to operation 1008.

Operation 1008 depicts determining that the authorized configuration of the remote computer differs from a current configuration of the remote computer, wherein the message from the remote computer indicates the current configuration of the remote computer. In some examples, operation 1008 can be implemented in a similar manner as operation 708 of FIG. 7.

After operation 1008, process flow 1000 moves to operation 1010.

Operation 1010 depicts determining a trust metrics evaluation score for the remote computer based on a type of hardware component change between the authorized configuration of the remote computer and the current configuration of the remote computer. In some examples, operation 1010 can be implemented in a similar manner as operation 710 of FIG. 7.

In some examples, the type of hardware component change comprises a reset of a remote access controller hardware component. This can be similar to operation 606 of FIG. 6.

In some examples, the type of hardware component change comprises a firmware update of a remote access controller hardware component. This can be similar to operation 610 of FIG. 6.

In some examples, the type of hardware component change comprises a reset of a remote access controller hardware component. This can be similar to operation 610 of FIG. 6.

In some examples, the type of hardware component change comprises a replacement of a hardware component. This can be similar to operation 620 of FIG. 6. After operation 1010, process flow 1000 moves to operation 1012.

Operation 1012 depicts, in response to determining that the trust metrics evaluation score is greater than a specified threshold value, onboarding the remote computer. In some examples, operation 1012 can be implemented in a similar manner as operation 712 of FIG. 7.

In some examples, the onboarding of the remote computer comprises continuing to use a pre-existing client identifier for the remote computer that is stored on the system, and determining to refrain from the onboarding of the remote computer comprises determining to use a second client identifier for the remote computer that differs from the pre-existing client identifier. That is, where verification is successful, a computer can be placed in a trusted secure onboarding state, and can reuse an existing cloud manager client ID instance to establish trust between a cloud manager client and a console onboarding process.

After operation 1012, process flow 1000 moves to 1014, where process flow 1000 ends.

Figure 11:
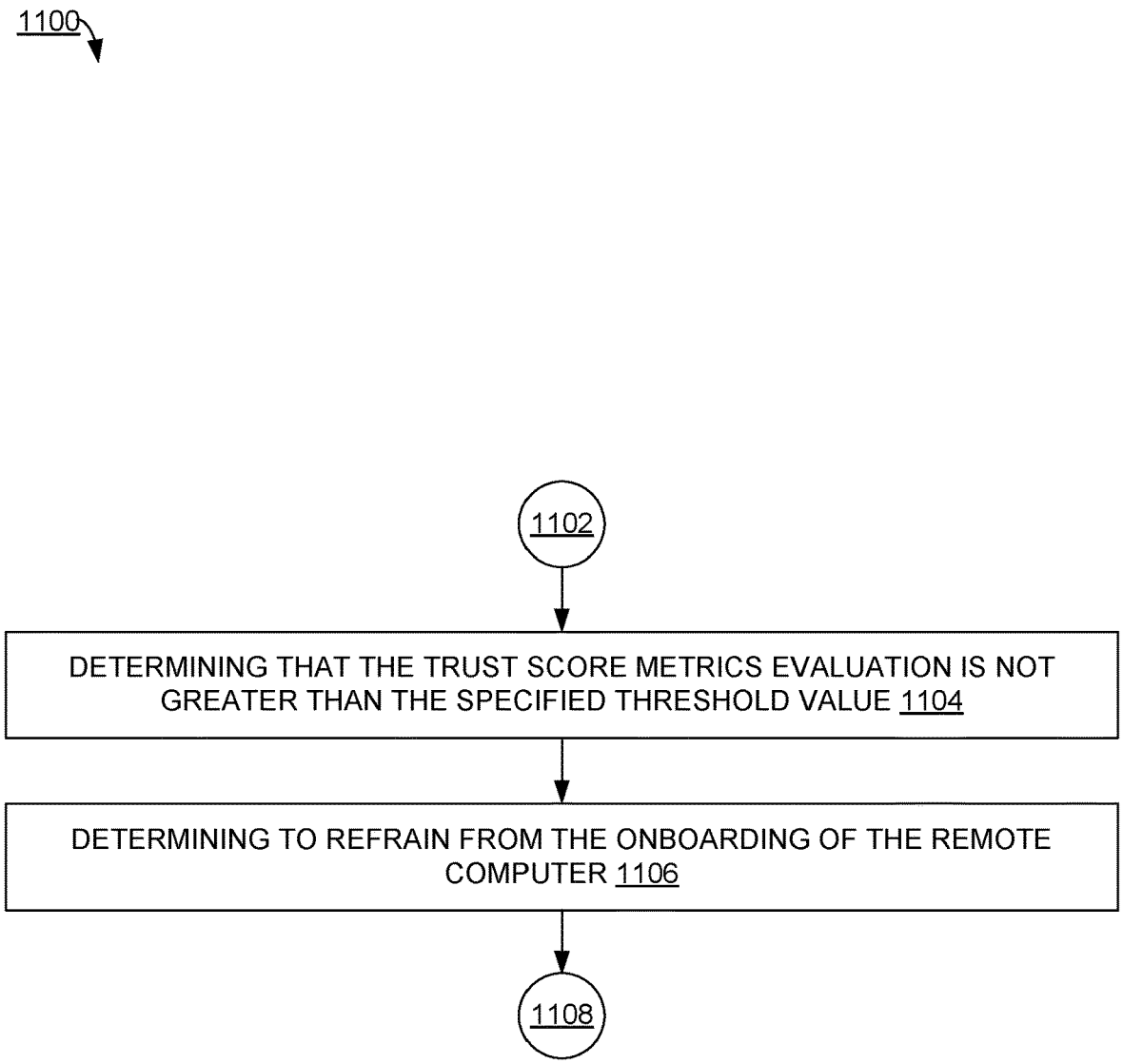
FIG. 11 illustrates another example process flow that can facilitate trusted cloud device lifecycle management, in accordance with an embodiment of this disclosure.

FIG. 11 illustrates another example process flow 1100 that can facilitate trusted cloud device lifecycle management, in accordance with an embodiment of this disclosure. In some examples, one or more embodiments of process flow 1100 can be implemented by trusted cloud device lifecycle management component 108 of FIG. 1, or computing environment 1300 of FIG. 13.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1200 of FIG. 12.

Process flow 1100 begins with 1102, and moves to operation 1104.

Operation 1104 depicts determining that the trust score metrics evaluation is not greater than the specified threshold value. Using the example of FIG. 5, this can comprise determining that the trust score metrics evaluation is not greater than 3 in operation 524.

After operation 1104, process flow 1100 moves to operation 1106.

Operation 1106 depicts determining to refrain from the onboarding of the remote computer. Continuing with the example of FIG. 5, where the computer lacks a sufficient trust score, it can be that it is not onboarded, and it can later again request to be onboarded, as in operation 504.

Together, operations 1104-1106 can comprise, in response to determining that the trust score metrics evaluation is not greater than the specified threshold value, determining to refrain from the onboarding of the remote computer.

After operation 1106, process flow 1100 moves to 1108, where process flow 1100 ends.

Figure 12:
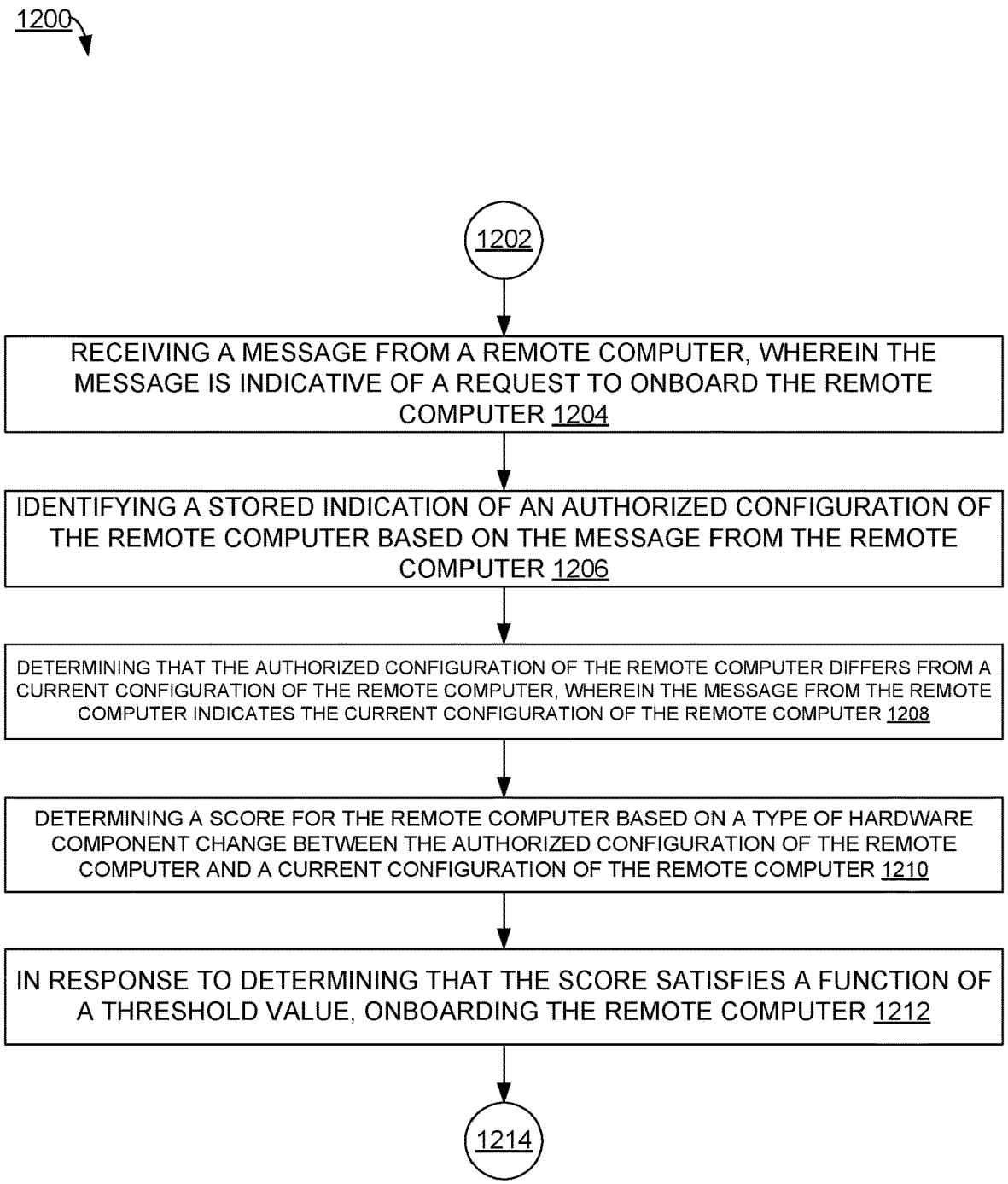
FIG. 12 illustrates another example process flow that can facilitate trusted cloud device lifecycle management, in accordance with an embodiment of this disclosure.

FIG. 12 illustrates another example process flow 1200 that can facilitate trusted cloud device lifecycle management, in accordance with an embodiment of this disclosure. In some examples, one or more embodiments of process flow 1200 can be implemented by trusted cloud device lifecycle management component 108 of FIG. 1, or computing environment 1300 of FIG. 13.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 500 of FIG. 5, process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Process flow 1200 begins with 1202, and moves to operation 1204.

Operation 1204 depicts receiving a message from a remote computer, wherein the message is indicative of a request to onboard the remote computer. In some examples, operation 1204 can be implemented in a similar manner as operation 704 of FIG. 7. After operation 1204, process flow 1200 moves to operation 1206.

Operation 1206 depicts identifying a stored indication of an authorized configuration of the remote computer based on the message from the remote computer. In some examples, operation 1206 can be implemented in a similar manner as operation 706 of FIG. 7.

After operation 1206, process flow 1200 moves to operation 1208.

Operation 1208 depicts determining that the authorized configuration of the remote computer differs from a current configuration of the remote computer, wherein the message from the remote computer indicates the current configuration of the remote computer. In some examples, operation 1208 can be implemented in a similar manner as operation 708 of FIG. 7.

After operation 1208, process flow 1200 moves to operation 1210.

Operation 1210 depicts determining a score for the remote computer based on a type of hardware component change between the authorized configuration of the remote computer and a current configuration of the remote computer. In some examples, operation 1210 can be implemented in a similar manner as operation 710 of FIG. 7.

In some examples, the type of hardware component change comprises a replacement of a field replaceable unit hardware component. This can be similar to operation 620 of FIG. 6.

In some examples, the replacement of the field replaceable unit hardware component results in a new field replaceable unit hardware component being installed in the remote computer, the score is based on an attestation of the field replaceable unit by the remote computer, and the attestation occurs independently of receiving user input data regarding the attestation. This can be similar to operation 622 of FIG. 6.

In some examples, the type of hardware component change comprises a replacement of a motherboard. This can be similar to operation 626 of FIG. 6.

In some examples, the replacement of the motherboard results in a new motherboard being installed in the remote computer, wherein the score is based on an attestation of the new motherboard by the remote computer, and wherein the attestation occurs based on receiving user input data regarding the attestation. This can be similar to operation 628 of FIG. 6.

In some examples, a first value of the score associated with modifying a remote access controller hardware component is greater than a second score of the value associated with replacing a hardware component that differs from the remote access controller hardware component. That is, different changes to a computer can lead to different trust scores, as seen where resetting a remote access controller hardware component can lead to a trust score of 5 (operations 606-608 of FIG. 6); where resetting a remote access controller hardware component and updating its firmware can lead to a trust score of 4 (operations 610-612 of FIG. 6); and replacing a FRU or a motherboard (operations 620 and 626, respectively) can lead to a trust score of 0-3 (operations 630-636).

After operation 1210, process flow 1200 moves to operation 1212.

Operation 1212 depicts, in response to determining that the score satisfies a function of a threshold value, onboarding the remote computer. In some examples, operation 1212 can be implemented in a similar manner as operation 712 of FIG. 7.

After operation 1212, process flow 1200 moves to 1214, where process flow 1200 ends.

Example Operating Environment

In order to provide additional context for various embodiments described herein, FIG. 13 and the following discussion are intended to provide a brief, general description of a suitable computing environment 1300 in which the various embodiments of the embodiment described herein can be implemented.

For example, parts of computing environment 1300 can be used to implement one or more embodiments of hybrid cloud management system 102 and/or on-premises computers 106 of FIG. 1.

In some examples, computing environment 1300 can implement one or more embodiments of the process flows of FIGS. 5-12 to facilitate trusted cloud device lifecycle management.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile storage such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples, and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    at least one processor; and
    at least one memory coupled to the processor, comprising instructions that, in response to execution by the at least one processor, cause the system to perform operations, comprising:
        storing an indication of a network address in a remote computer prior to a transfer of possession of the remote computer from a first entity associated with the system to a second entity, wherein the network address is associated with the system;
        receiving an untrusted onboard announcement message from the remote computer, wherein the untrusted onboard announcement message comprises first data that identifies the remote computer and second data that indicates a current configuration of the remote computer, and wherein the untrusted onboard announcement message received from the remote computer is directed to the network address;
        identifying a stored indication of an authorized configuration of the remote computer based on the data that identifies the remote computer;
        determining that there is a mismatch between the authorized configuration of the remote computer and the current configuration of the remote computer;
        determining a trust metrics evaluation score for the remote computer based on a type of hardware component change between the authorized configuration of the remote computer and the current configuration of the remote computer; and
        in response to determining that the trust metrics evaluation score is greater than a threshold value, onboarding the remote computer.

2. The system of claim 1, wherein the untrusted onboard announcement message is a first untrusted onboard announce message, wherein the onboarding of the remote computer is a first onboarding, and wherein the operations further comprise:
    before receiving the first untrusted onboard announce message, and in response to receiving a second untrusted onboard announce message from the remote computer, wherein the second untrusted onboard announce message comprises an initial untrusted onboard announce message from the remote computer and information to be verified, verifying the information in the second untrusted onboard announce message, and in response to the verifying, performing a second onboarding of the remote computer, wherein the second onboarding of the remote computer comprises an initial onboarding of the remote computer.

3. The system of claim 2, wherein the information is first information, and wherein the verifying of the first information in the second untrusted onboard announce message comprises comparing the first information in the second untrusted onboard announce message with second information about ordering the remote computer.

4. The system of claim 2, wherein the information in the second untrusted onboard announce message originates from a certificate stored on the remote computer, and wherein the certificate is signed by the system.

5. The system of claim 2, wherein a first entity performs the verifying of the information in the second untrusted onboard announce message, wherein a second entity has physical possession of the remote computer at a time that the verifying of the information in the second untrusted onboard announce message is performed, and wherein the first entity has processed an order by the second entity for the remote computer.

6. The system of claim 1, wherein the type of hardware component change comprises a replacement of a field replaceable unit hardware component, wherein the replacement of the field replaceable unit hardware component results in a new field replaceable unit hardware component being installed in the remote computer, wherein the trust metrics evaluation score is based on an attestation of the field replaceable unit by the remote computer, and wherein the attestation occurs independently of receiving user input data regarding the attestation.

7. The system of claim 1, wherein the type of hardware component change comprises a replacement of a motherboard, wherein the replacement of the motherboard results in a new motherboard being installed in the remote computer, wherein the trust metrics evaluation score is based on an attestation of the new motherboard by the remote computer, and wherein the attestation occurs based on receiving user input data regarding the attestation.

8. A method, comprising:
storing, by a system comprising at least one processor, an indication of a network address that is associated with the system in a remote computer prior to a transfer of possession of the remote computer from a first entity associated with the system to a second entity;
receiving, by the system, a message from the remote computer, wherein the message is indicative of a request to onboard the remote computer, and wherein the message is directed to the network address;
identifying, by the system, a stored indication of an authorized configuration of the remote computer based on the message from the remote computer;
determining, by the system, that the authorized configuration of the remote computer differs from a current configuration of the remote computer, wherein the message from the remote computer indicates the current configuration of the remote computer;
determining, by the system, a trust metrics evaluation score for the remote computer based on a type of hardware component change between the authorized configuration of the remote computer and the current configuration of the remote computer; and in response to determining that the trust metrics evaluation score is greater than a specified threshold value, onboarding, by the system, the remote computer.

9. The method of claim 8, wherein the onboarding of the remote computer comprises continuing to use a pre-existing client identifier for the remote computer that is stored on the system.

10. The method of claim 8, further comprising:
in response to determining that the trust score metrics evaluation is not greater than the specified threshold value, determining, by the system, to refrain from the onboarding of the remote computer.

11. The method of claim 8, wherein the type of hardware component change comprises a reset of a remote access controller hardware component.

12. The method of claim 8, wherein the type of hardware component change comprises a firmware update of a remote access controller hardware component.

13. The method of claim 8, wherein the type of hardware component change comprises a replacement of a hardware component.

14. The method of claim 8, wherein the message is a first announce message, wherein the onboarding of the remote computer is a first onboarding, and wherein the operations further comprise:
before receiving the first message, and in response to receiving a second message from the remote computer, wherein the second message comprises an initial message from the remote computer and information to be verified,
verifying the information in the second message, and
in response to the verifying, performing a second onboarding of the remote computer, wherein the second onboarding of the remote computer comprises an initial onboarding of the remote computer.

15. The method of claim 10, wherein refraining from the onboarding of the remote computer comprises using a second client identifier for the remote computer that differs from a pre-existing client identifier for the remote computer that is stored on the system.

16. A non-transitory computer-readable medium comprising instructions that, in response to execution, cause a system comprising at least one processor to perform operations, comprising:
storing an indication of a network address that is associated with the system in a remote computer prior to a transfer of possession of the remote computer from a first entity associated with the system to a second entity;
receiving a message from the remote computer, wherein the message is indicative of a request to onboard the remote computer, and wherein the message is directed to the network address;
identifying a stored indication of an authorized configuration of the remote computer based on the message from the remote computer;
determining that the authorized configuration of the remote computer differs from a current configuration of the remote computer, wherein the message from the remote computer indicates the current configuration of the remote computer;
determining a score for the remote computer based on a type of hardware component change between the authorized configuration of the remote computer and the current configuration of the remote computer; and in response to determining that the score satisfies a function of a threshold value, onboarding the remote computer.

17. The non-transitory computer-readable medium of claim 16, wherein the type of hardware component change comprises a replacement of a field replaceable unit hardware component, wherein the replacement of the field replaceable unit hardware component results in a new field replaceable unit hardware component being installed in the remote computer, wherein the score is based on an attestation of the field replaceable unit by the remote computer, and wherein the attestation occurs independently of receiving user input data regarding the attestation.

18. The non-transitory computer-readable medium of claim 17, wherein the replacement of the field replaceable unit hardware component results in a new field replaceable unit hardware component being installed in the remote computer, wherein the score is based on an attestation of the field replaceable unit by the remote computer, and wherein the attestation occurs independently of receiving user input data regarding the attestation.

19. The non-transitory computer-readable medium of claim 16, wherein the type of hardware component change comprises a replacement of a motherboard.

20. The non-transitory computer-readable medium of claim 19, wherein the replacement of the motherboard results in a new motherboard being installed in the remote computer, wherein the score is based on an attestation of the new motherboard by the remote computer, and wherein the attestation occurs based on receiving user input data regarding the attestation.

\* \* \* \* \*